(12) United States Patent
Washino et al.

(10) Patent No.: US 6,481,633 B1
(45) Date of Patent: Nov. 19, 2002

(54) IC INCORPORATING CARD WITH A GROUNDING STRUCTURE

(75) Inventors: Kiyoshi Washino; Yoshitaka Shobara, both of Kanagawa (JP)

(73) Assignee: J. S. T. Mfg. Co., Ltd., Osaka (JP)

( * ) Notice: Subject to any disclaimer, the term of this patent is extended or adjusted under 35 U.S.C. 154(b) by 0 days.

(21) Appl. No.: 09/605,831

(22) Filed: Jun. 29, 2000

(30) Foreign Application Priority Data

Jul. 6, 1999 (JP) .......................................... 11-192152

(51) Int. Cl.⁷ .............................................. G06K 19/06
(52) U.S. Cl. ...................... 235/492; 235/487; 235/466
(58) Field of Search ................. 235/492, 486, 235/487

(56) References Cited

U.S. PATENT DOCUMENTS

| | | | |
|---|---|---|---|
| 5,009,618 A | * 4/1991 | Black et al. | 439/736 |
| 5,710,693 A | * 1/1998 | Tsukada et al. | 361/684 |
| 5,749,741 A | 5/1998 | Bellas et al. | 439/95 |
| 5,850,690 A | * 12/1998 | Launay et al. | 174/52.2 |
| 5,870,289 A | * 2/1999 | Tokuda et al. | 174/260 |
| 6,166,324 A | * 12/2000 | Oldendorf et al. | 174/35 MS |
| 6,326,683 B1 | * 12/2001 | Houdeau et al. | 257/668 |

FOREIGN PATENT DOCUMENTS

| | | |
|---|---|---|
| EP | 0 774 733 A2 | 5/1997 |
| JP | 3-096396 | 4/1991 |
| JP | 5-325535 | 12/1993 |
| JP | 6-177573 | 6/1994 |
| JP | 6-309522 | 11/1994 |
| JP | 7-179085 | 7/1995 |
| JP | 409001970 | * 1/1997 |
| JP | 2736749 | 1/1998 |
| JP | 11-54235 | 2/1999 |
| JP | 11-054235 | 2/1999 |
| WO | WO 96/04698 A1 | 2/1996 |

* cited by examiner

*Primary Examiner*—Karl D. Frech
*Assistant Examiner*—Allyson Sanders
(74) *Attorney, Agent, or Firm*—Rader, Fishman & Grauer PLLC

(57) ABSTRACT

An IC-incorporating card has a grounding structure which ensures reliable grounding of metal panels thereof and employs a connector which is usable in common for cards having different thicknesses. The card includes a board mounted with an integrated circuit, a resin frame defining an internal space for accommodating the board, first and second metal panels attached to the resin frame to define the internal space, a connector mounted on the board, and a grounding structure for grounding the first and second metal panels. The connector has first and second grounding conductor elements. The first metal panel is connected to the first grounding conductor element via a grounding connection element embedded in the resin frame. The second metal panel is directly connected to the second grounding conductor element.

5 Claims, 9 Drawing Sheets

IC INCORPORATING CARD WITH A GROUNDING STRUCTURE

BACKGROUND OF THE INVENTION

1. Field of the Invention

The present invention relates to an IC-incorporating card such as a PC card or a CF card.

2. Description of Related Art

Compact and portable information systems such as electronic personal organizers and digital cameras, for example, have a CF card slot in which a CF card (CompactFlash (trade mark)) is to be mounted. The CF card mounted in the CF card slot allows for extension of the capabilities of the portable information systems. The CF card is of a card shape as a whole and has, for example, a board mounted with an integrated circuit such as a memory IC, a connector mounted on the board for electrical connection to the CF card slot, a resin frame holding the board and the connector, and a pair of metal panels covering upper and lower sides of the board.

For static prevention, the metal panels are preferably grounded. This improves the reliability of the CF card. Japanese Unexamined Patent Publication No. 6-177573 (1994), for example, discloses a grounding structure which includes grounding terminals provided in the connector, and grounding spring elements respectively formed integrally with the grounding terminals as projecting toward the upper and lower metal panels to contact the metal panels for the grounding of the metal panels.

In the meanwhile, the CF card includes two types of CF cards in conformity with the CFA (CompactFlash Association) Standards, i.e., Type I having a thickness of 3.3 mm and Type II having a thickness of 5.0 mm. The CF cards of Type I and Type II have the same pin configuration, so that connectors to be used for these CF cards may have the same construction.

Where the aforesaid grounding structure is employed in which the grounding spring elements project from the connector to reach the upper and lower metal panels, however, the connector cannot be employed in common for the CF cards of Type I and Type II which have different thicknesses. Therefore, the connectors for the CF cards of Type I and Type II should separately be designed and manufactured, resulting in a cost increase.

Another conceivable grounding structure is such that spring members are provided between a ground pattern on the board and the upper and lower metal panels for the grounding of the metal panels. With this grounding structure, the CF cards of Type I and Type II can employ connectors of the same construction in common. However, the grounding structure requires an increased number of components, and reliable attachment of the spring members is not always easy, so that the grounding structure should manually be assembled. Further, the grounding reliability may be reduced due to displacement and dislodgement of the spring members, and the costs may be increased.

SUMMARY OF THE INVENTION

It is an object of the present invention to provide an IC-incorporating card having a grounding structure which ensures reliable grounding of metal panels thereof and employs a connector which is usable in common for cards having different thicknesses.

The IC-incorporating card according to the present invention comprises a board mounted with an integrated circuit, a resin frame defining an internal space for accommodating the board, first and second metal panels attached to the resin frame to define the internal space, a connector mounted on the board, and a grounding structure for grounding the first and second metal panels.

The connector has a plurality of contacts retained in a housing thereof for electrical connection to a card slot. The connector further has first and second grounding conductor elements connected to a ground contact of the plurality of contacts which is to be connected to a ground portion of the card slot, the first and second grounding conductor elements being exposed from the housing to be opposed to the first and second metal panels, respectively.

The grounding structure has a grounding connection element embedded in the resin frame, and the first and second metal panels are electrically connected to the ground contact with the first grounding conductor element being electrically connected to the first metal panel via the grounding connection element and with the second grounding conductor element being in direct contact with the second metal panel for electrical connection therebetween.

With this arrangement, the first metal panel is connected to the first grounding conductor element of the connector via the grounding connection element embedded in the resin frame, while the second metal panel is directly connected to the second grounding conductor element of the connector. This arrangement is applied to a relatively thick IC-incorporating card (e.g., CF card of Type II). Where the aforesaid connector is employed for a relatively thin IC-incorporating card (e.g., CF card of Type I), the first and second grounding conductor elements are respectively brought into direct contact with the pair of metal panels. Thus, the connector of the same construction is applicable in common to the plural types of IC-incorporating cards having different thicknesses, so that the production costs of the IC-incorporating cards can be reduced.

Since the grounding connection element connecting the first metal panel to the first grounding conductor element is embedded in the resin frame, the resin frame and the grounding connection element are handled virtually as a unitary member. Therefore, the card can easily be assembled with a reduced number of components. With the simplified construction, the assembling cost can be reduced. Further, the grounding connection element embedded in the resin frame can assuredly be connected to the first grounding conductor element of the connector with its position precisely defined, so that the first metal panel can assuredly be grounded.

The first and second grounding conductor elements may have substantially the same construction.

The grounding connection element is preferably integrated with the resin frame by simultaneous molding. With this arrangement, the grounding connection element integrated with the resin frame by the simultaneous molding can precisely be positioned, so that the electrical connection between the grounding connection element and the first grounding conductor element can reliably be established.

The grounding connection element is preferably formed integrally with the first metal panel. This arrangement ensures easy formation of the grounding connection element.

The grounding connection element is preferably a portion of the first metal panel bent at an edge thereof adjacent to the connector as extending through the resin frame toward the connector.

The foregoing and other objects, features and effects of the present invention will become more apparent from the following description of the preferred embodiments with reference to the attached drawings.

DESCRIPTION OF THE PREFERRED EMBODIMENTS

The following embodiments of the present invention are directed to CF cards, but the invention is applicable to other IC-incorporating cards, such as PC cards and small PC cards, according to other standards.

Figure 1:
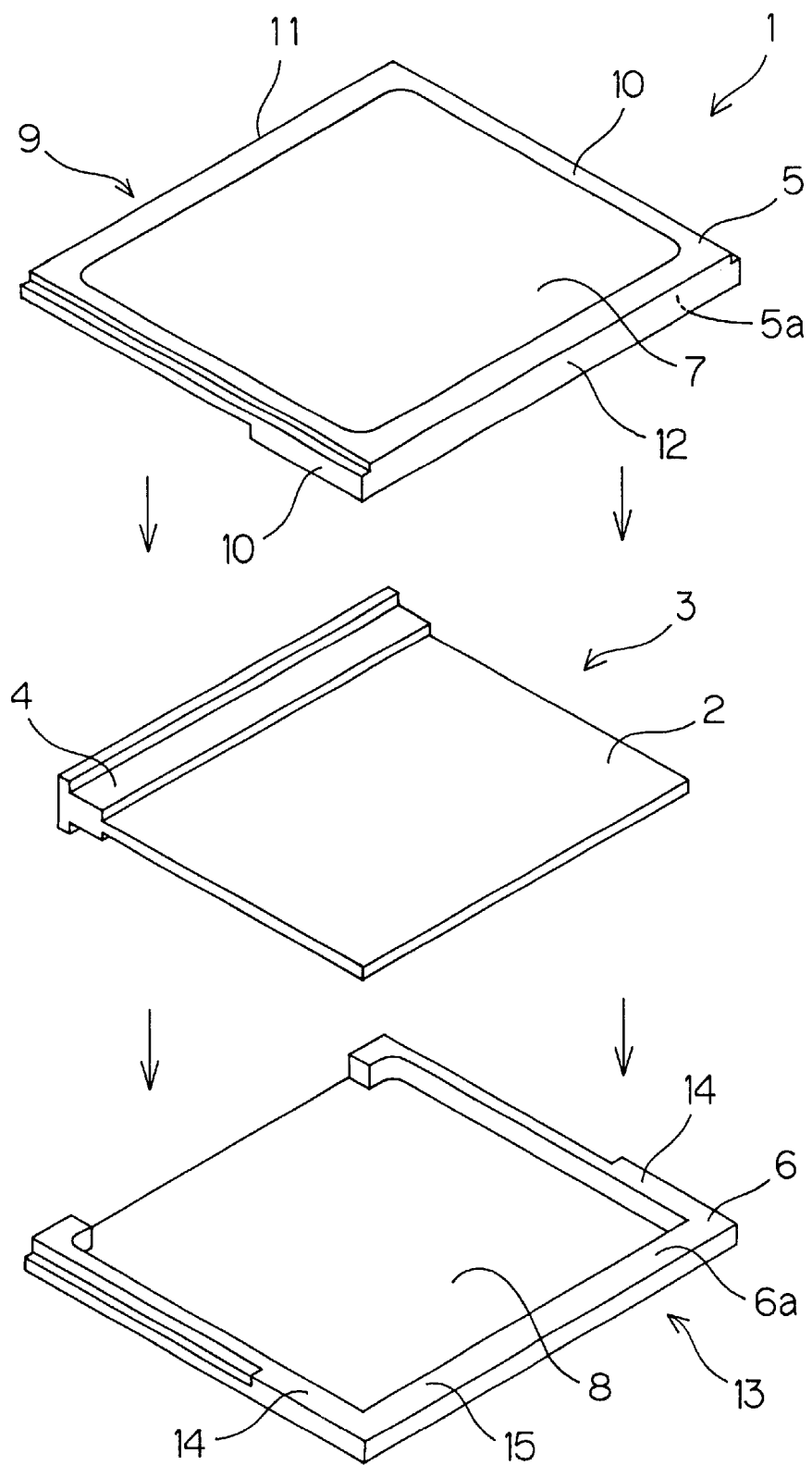
FIG. 1 is an exploded perspective view of a CF card (Type II) according to one embodiment of the present invention.

FIG. 1 is an exploded perspective view illustrating the construction of a CF card 1 according to one embodiment of the present invention. The CF card 1 includes a board assembly 3, an upper resin frame 5 and a lower resin frame 6 defining an internal space of the CF card 1 therebetween, a first metal panel 7 covering an upper surface of the board assembly 3, and a second metal panel 8 covering a lower surface of the board assembly 3. The board assembly 3 includes a printed board 2 mounted with an integrated circuit not shown, and a connector 4 attached to a front edge of the printed board 2.

The first metal panel 7 is of a generally rectangular shape, and is located on the upper side of the CF card 1 in an ordinary use state. The first metal panel 7 is integrated with the upper resin frame 5 of a rectangular ring shape by simultaneous molding to form an upper frame-panel assembly 9. The upper resin frame 5 has a generally rectangular ring shape. The upper resin frame 5 has a pair of side beams 10 opposed to each other, a front beam 11 linking front ends of the pair of side beams 10, and a rear beam 12 linking rear ends of the pair of side beams 10.

The second metal panel 8 is of a generally rectangular shape, and is located on the lower side of the CF card 1 in the ordinary use state. The second metal panel 8 is integrated with the lower resin frame 6 by simultaneous molding to form a lower frame-panel assembly 13. The lower resin frame 6 has a generally open square shape. The lower resin frame 6 has a pair of side beams 14, and a rear beam 15 linking rear ends of the pair of side beams 14.

The board assembly 3 is accommodated in a space defined between the upper frame-panel assembly 9 and the lower frame-panel assembly 13. A lower surface 5a of the upper resin frame 5 and an upper surface 6a of the lower resin frame 6 are bonded to each other, for example, by an ultrasonic fusion bonding method. Thus, the CF card 1 is assembled. For use, the CF card 1 is fitted in a CF card slot (not shown) provided in a portable information system for extension of the capabilities of the system. The CF card 1 is a CF card of Type II which has a relatively great thickness (5 mm).

Figure 2:
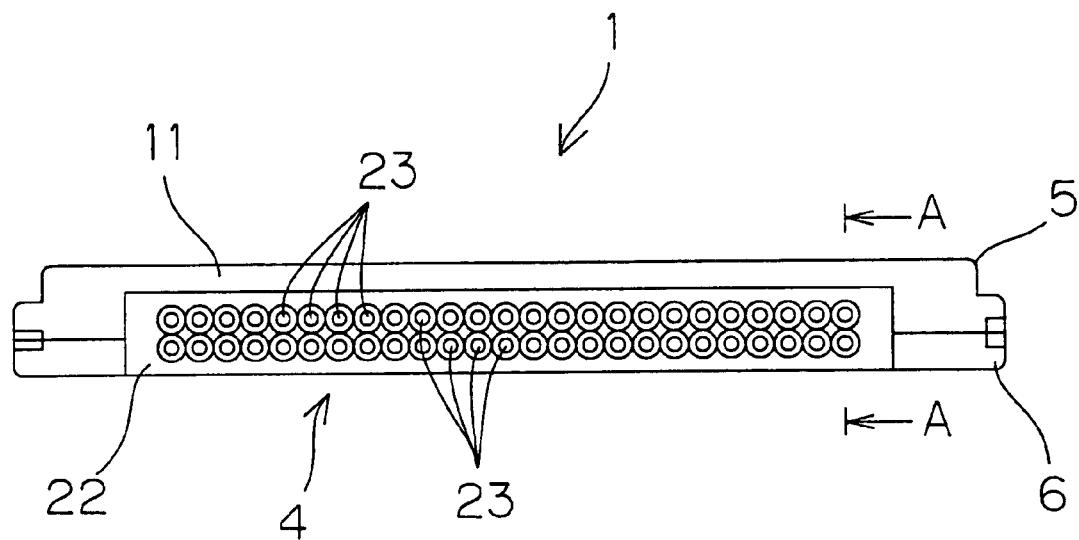
FIG. 2 is a front view of the CF card (Type II) as seen from the side of a connector thereof.

FIG. 2 is a front view of the CF card 1 as seen from the side of the connector 4. The connector 4 has a resin housing 22 of a generally elongated rectangular shape. A plurality of contact retaining holes 23 for receiving round pins of the CF card slot for electrical connection between the printed board 2 and the portable information system are formed in the housing 22 of the connector 4. The contact retaining holes 23 are arranged correspondingly to the number and arrangement of the round pins. In the CF card 1 according to this embodiment, 25 contact retaining holes are arranged in each of upper and lower rows. Contacts 27 (see FIG. 4) to be described later are respectively retained in the contact retaining holes 23.

The CF card 1 of Type II has a greater thickness than a CF card of Type I. However, the CF cards of Type I and Type II have the same pin configuration, so that the connector 4 of the CF card of Type II can be employed in common for the CF card of Type I in this embodiment. In this respect, the resin frame 5 of the CF card 1 of Type II has a thickness greater by a thickness difference between the CF card of Type I and the CF card 1 of Type II than a resin frame of the CF card of Type I. As seen from the front side of the CF card 1 of Type II in FIG. 2, the front beam 11 of the upper resin frame 5 having the thickness corresponding to the thickness difference between the CF card of Type I and the CF card 1 of Type II is present on the connector 4.

Figure 3:
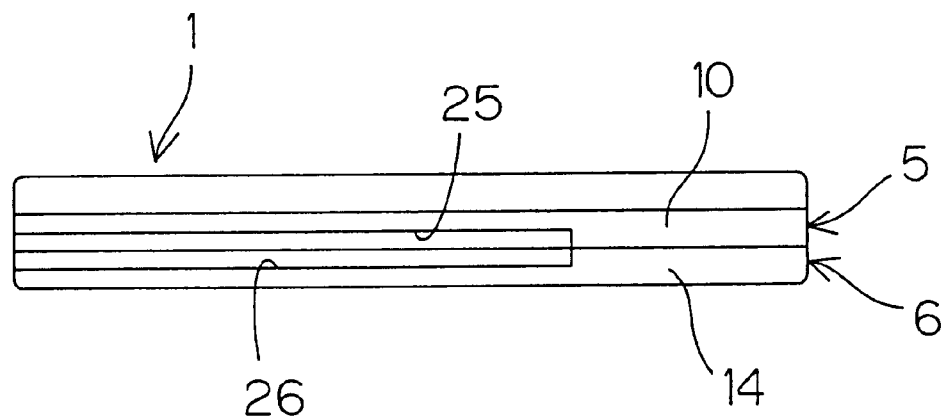
FIG. 3 is a side view of the CF card (Type II)

FIG. 3 is a side view of the CF card 1. The side beams 10 of the upper resin frame 5 each have a first mis-insertion prevention key groove 25 formed in an outer side face thereof as opening downward. Further, the side beams 14 of the lower resin frame 6 each have a second mis-insertion prevention key groove 26 formed in an outer side face thereof as opening upward. After the assembling of the CF card 1, the outer side faces of the side beams 10, 14 of the respective resin frames 5, 6 are exposed to the outside to define side faces of the CF card 1, and the first mis-insertion prevention key grooves 25 are respectively joined to the second mis-insertion prevention key grooves 26 to constitute mis-insertion prevention keys. The mis-insertion prevention keys respectively extend from front ends of the side beams 10, 14 to positions rearwardly adjacent to the midpoints of the side beams. The mis-insertion prevention keys thus provided on the left and right outer side faces have different widths as vertically measured. This prevents the CF card 1 from being inserted into the CF card slot in a wrong orientation, e.g., in a vertically inverted manner, or with the rear side thereof ahead.

Next, an explanation will be given to the connector

Figure 4:
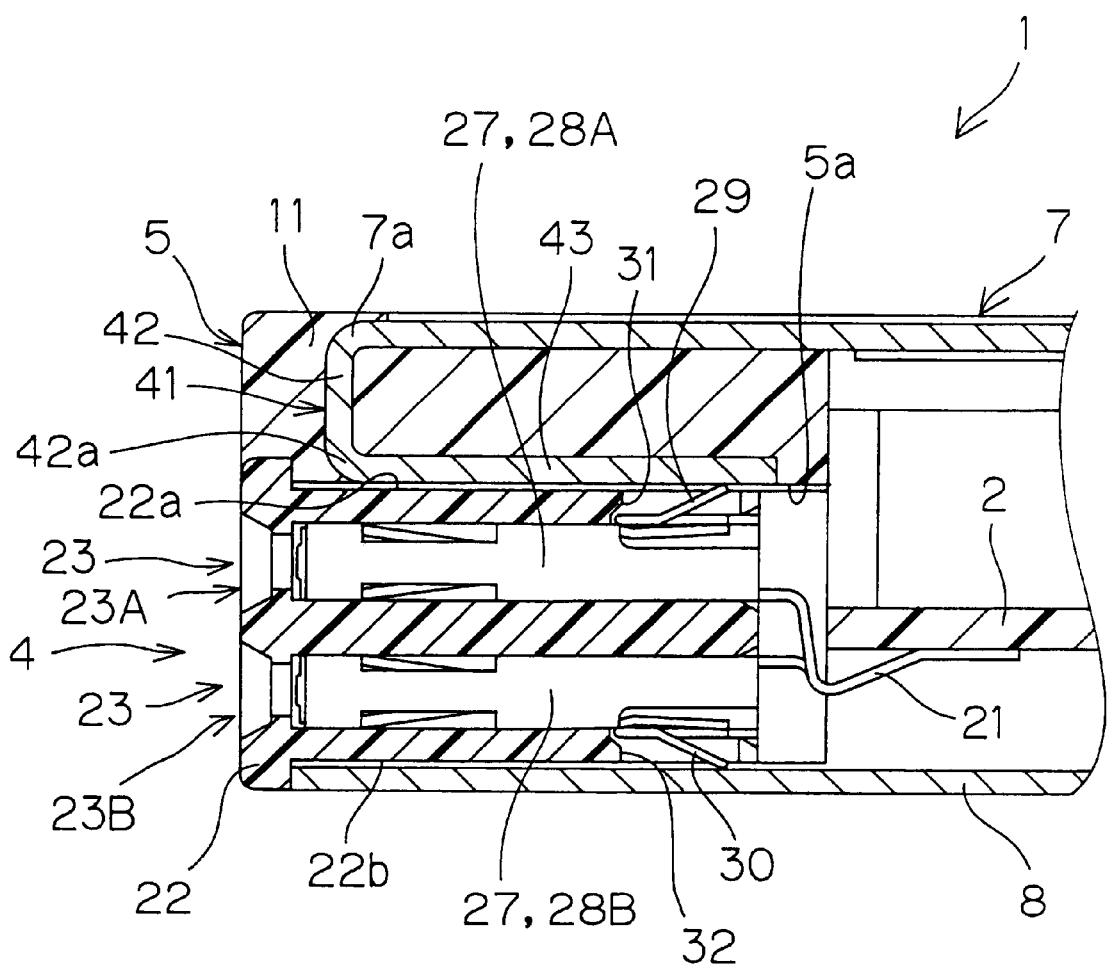
FIG. 4 is a sectional view of the CF card (Type II) taken along a section line A—A in FIG. 2.

FIG. 4 is a sectional view of the CF card 1 taken along a section line A—A in FIG. 2. The contacts 27 are respectively fitted in the contact retaining holes 23 of the connector 4. The contacts 27 each have a contact element 21 having a rear end soldered to a conductive pattern on a bottom face of the printed board 2. Of these contacts 27, pairs of contacts 28A, 28B, for example, located at opposite ends of the upper and lower rows serve as ground contacts which are to be connected to ground portions (ground pins) of the card slot.

First grounding conductor elements 29 are provided in association with the upper ground contacts 28A of these ground contacts 28A, 28B and connected to the upper ground contacts 28A, while second grounding conductor elements 30 are provided in association with the lower ground contacts 28B and connected to the lower ground contacts 28B. These first and second grounding conductor elements 29, 30 are fixed to the housing 22 of the connector 4 in unitary relation.

The housing 22 of the connector 4 has first through-holes 31 each extending therethrough from an upper surface 22a of the housing 22 to a contact retaining hole 23A in which the upper ground contact 28A is retained, and second through-holes 32 each extending therethrough from a lower surface 22b of the housing 22 to a contact retaining hole 23B in which the lower ground contact 28B is retained.

Figure 5:
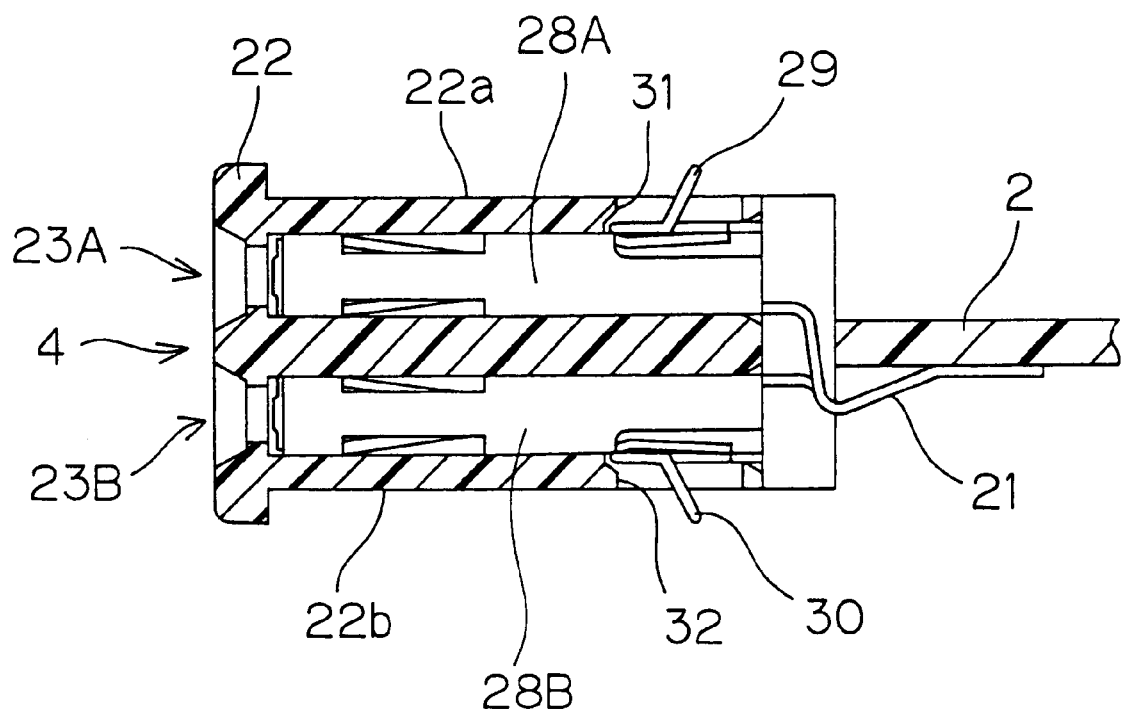
FIG. 5 is a sectional view of the connector.

The first grounding conductor elements 29 are generally chevron-shaped resilient elements which each extend through the first through-hole 31 to project upward from the upper surface 22a of the housing 22 as shown in FIG. 5.

The second grounding conductor elements 30 are configured and dimensioned in substantially the same manner as the first grounding conductor elements 29. More specifically, the second grounding conductor elements 30 are generally chevron-shaped resilient elements which each extend through the second through-hole 32 to project downward from the lower surface 22b of the housing 22.

Figure 6:
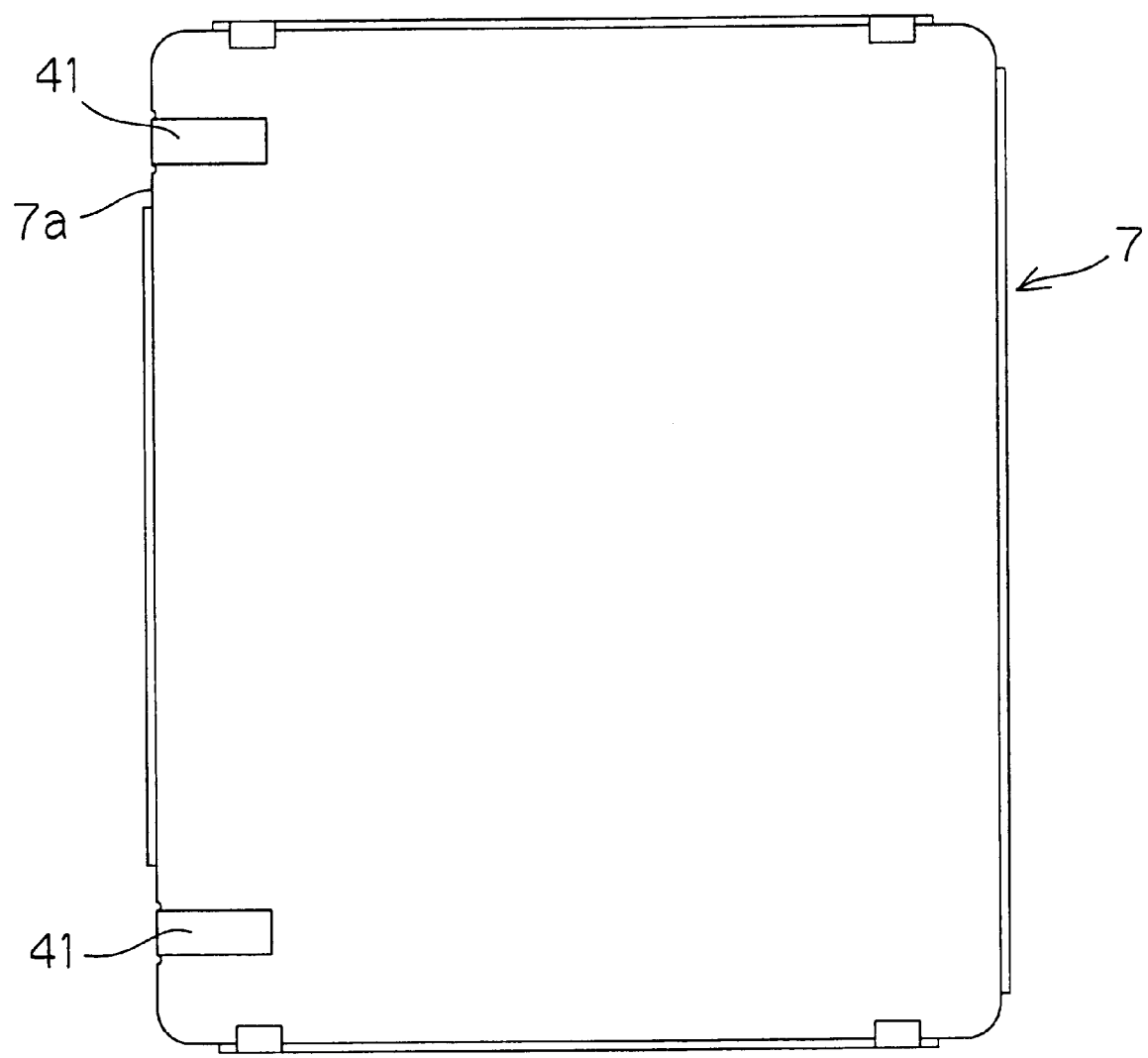
FIG. 6 is a bottom view of a first metal panel.
Figure 7:
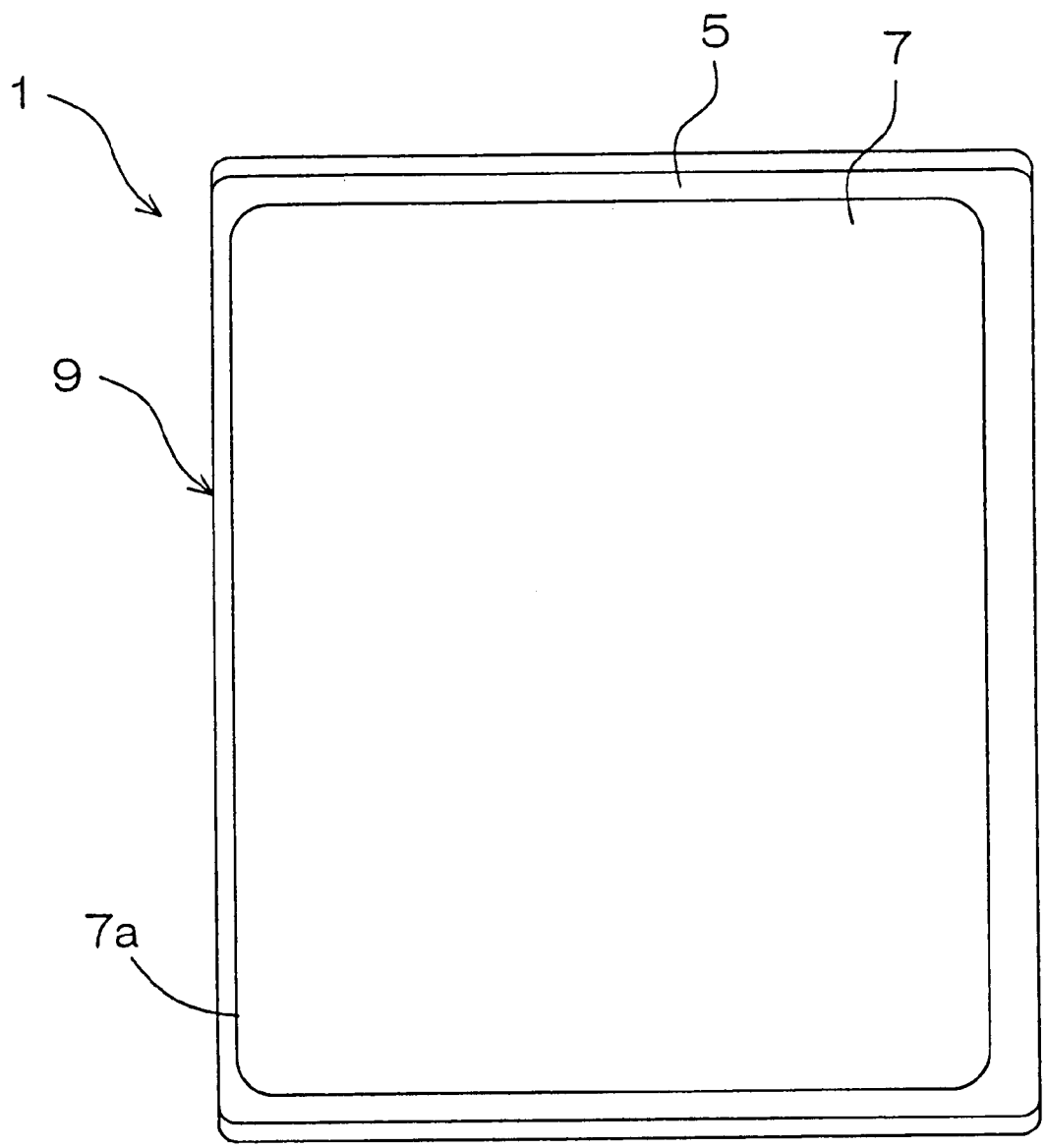
FIG. 7 is a plan view of the CF card.

As shown in FIG. 6, a pair of grounding connection elements 41 are provided adjacent opposite ends of a front edge 7a of the first metal panel 7.

Referring again to FIG. 4, the grounding connection elements 41 are formed integrally with the first metal panel 7. More specifically, the grounding connection elements 41 each have a downstanding portion 42 extending downward from the front edge 7a of the first metal panel 7 into the upper resin frame 5 inwardly of the CF card 1, and a bent portion 43 extending inward and rearward from a distal edge 42a of the downstanding portion 42 along the lower surface 5a of the upper resin frame 5 to reach a position which allows for connection to the first grounding conductor element 29. Thus, the grounding connection elements 41 are embedded in the front beam 11 of the upper resin frame 5. Since the grounding connection elements 41 are each configured to extend from the front edge 7a of the first metal panel 7 into the front beam 11 of the upper resin frame 5, the CF card 1 has a good appearance, as seen from the top of the CF card 1 (in plan), as in a case where the grounding connection elements are not provided.

After the assembling of the CF card 1, the first grounding conductor elements 29 respectively project toward the bent portions 43 of the grounding connection elements 41 to resiliently press against the grounding connection elements 41 as shown in FIG. 4. Further, the second grounding conductor elements 30 respectively project toward the second metal panel 8 to press against the interior surface of the second metal panel 8. In this manner, electrical connection between the first grounding conductor elements 29 and the grounding connection elements 41 of the first metal panel 7 and between the second grounding conductor elements 30 and the second metal panel 8 is achieved. Thus, the electrical connection between the metal panels 7, 8 and the ground contacts 28A, 28B is established, so that the first metal panel 7 and the second metal panel 8 are grounded when the CF card 1 is in use.

Figure 8:
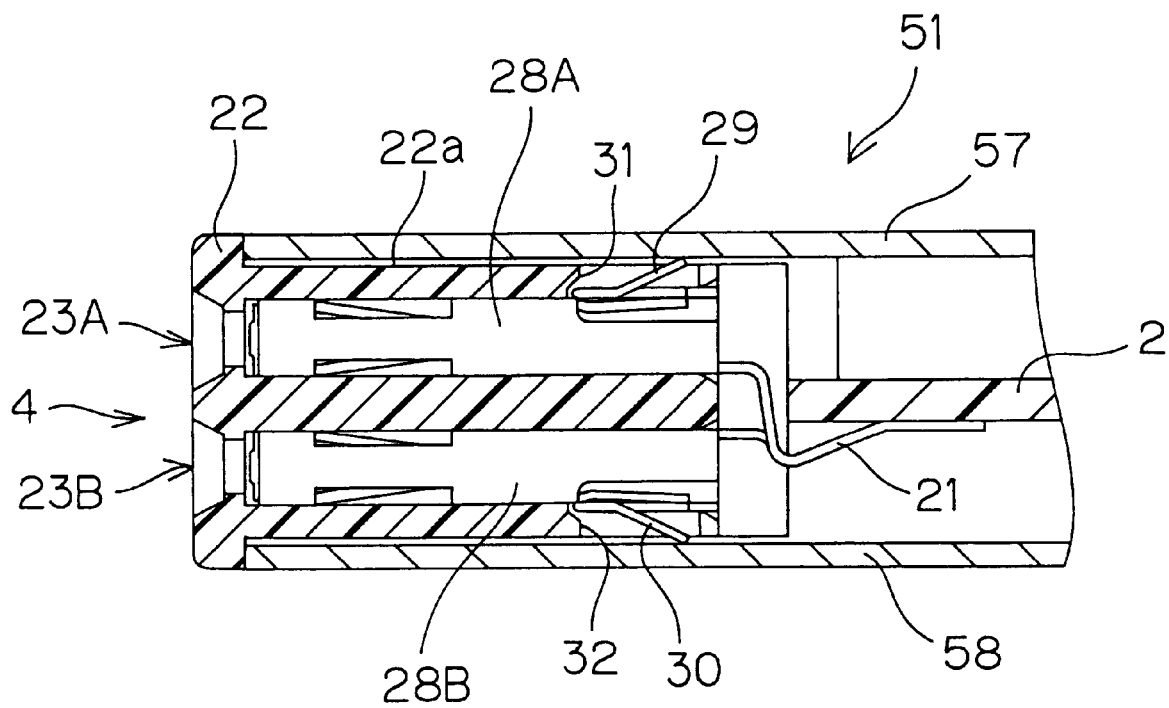
FIG. 8 is a sectional view illustrating major portions of a CF card of Type I which employs the connector shown in FIG. 5.

FIG. 8 is a sectional view illustrating major portions of a CF card 51 of Type I which employs the connector 4 shown in FIG. 5. The CF card 51 of Type I is relatively thin with a thickness of 3.3 mm. It is noted that the same components as those of the CF card 1 of Type II are denoted by the same reference characters.

In the CF card 51 of Type I, the connector 4 is held between first and second metal panels 57 and 58. In this state, the second grounding conductor elements 30 of the connector 4 are pressed against the interior surface of the second metal panel 58 in direct contact with the second metal panel 58 as in the case of the CF card 1 of Type II. Similarly, the first grounding conductor elements 29 are pressed against the interior surface of the first metal panel 57 in direct contact with the first metal panel 57. More specifically, where the connector 4 is used in the CF card 51 of Type I (thin card), the electrical connection between the ground contacts 28A and the first metal panel 57 is established with the first grounding conductor elements 29 in direct contact with the first metal panel 57. Where the connector 4 is used in the CF card 1 of Type II (thick card), however, the electrical connection between the grounding contacts 28A and the first metal panel 7 is established with the first grounding conductor elements 29 being connected to the first metal panel 7 via the grounding connection elements 41.

In accordance with this embodiment, the electrical connection between the metal panels 7, 8 and the grounding contacts 28A, 28B can thus properly be established by the grounding connection elements 41 embedded in the upper resin frame 5. Further, the first grounding conductor elements 29 of the connector 4 are resiliently deformed to resiliently press against the grounding connection elements 41, and the second grounding conductor elements 30 are resiliently deformed to press against the second metal panel 8.

Therefore, the electrical connection between the metal panels 7, 8 and the ground contacts 28A, 29B is achieved with a simplified construction. In addition, the connector 4 of the same construction can be employed in common for the CF card 51 of Type I and the CF card 1 of Type II. Thus, the production costs of the CF card 1 can be reduced.

Since the first metal panel 7 is integrated with the upper resin frame 5 by the simultaneous molding, the bent portions 43 of the grounding connection elements 41 unitary with the first metal panel 7 can precisely be positioned with respect to the lower surface 5a of the upper resin frame 5. Therefore, the grounding connection elements 41 are more assuredly be brought into contact with the first grounding conductor elements 29. In addition, the upper resin frame 5 and the grounding connection elements 41 can be handled as a virtually unitary member, so that the CF card 1 can easily be assembled with a reduced number of components at reduced costs.

Figure 9:
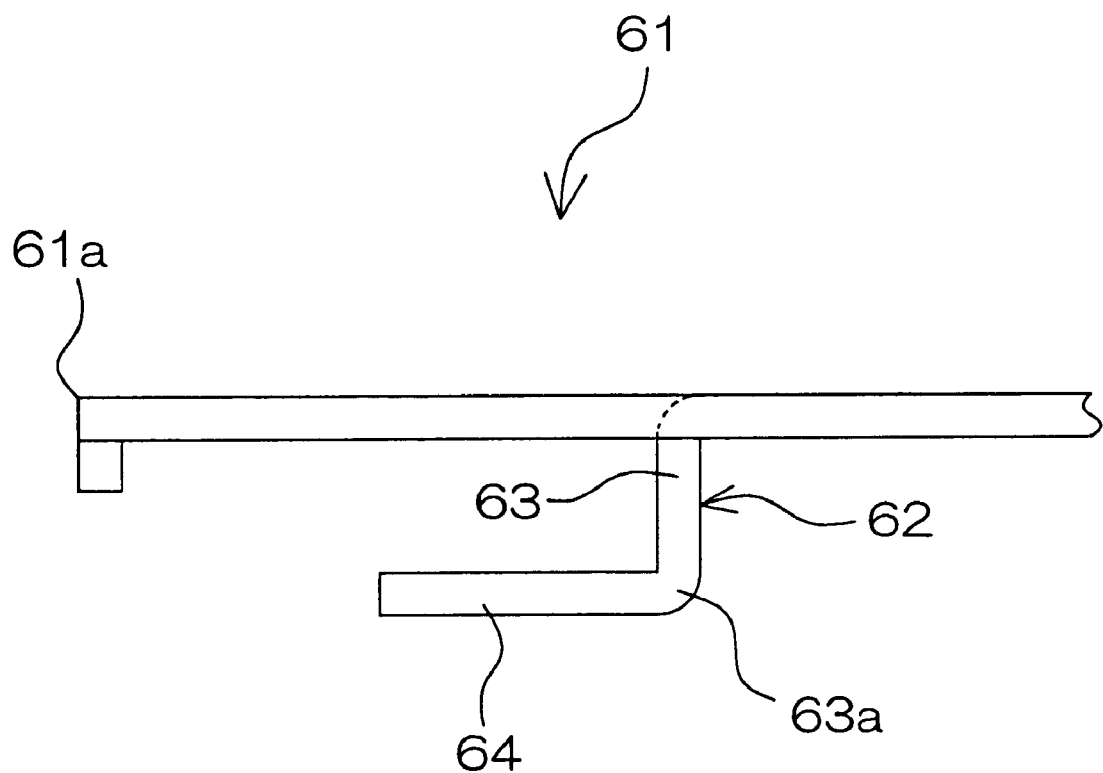
FIG. 9 is a side view illustrating a front portion of a first metal panel according to another embodiment of the present invention.

FIG. 9 is a side view illustrating the construction of a first metal panel 61 to be employed instead of the first metal panel 7 in a CF card according to another embodiment of the present invention. The first metal panel 61 according to this embodiment differs from the first metal panel 7 according to the embodiment shown in FIG. 1 in that grounding connection elements 62 are provided slightly rearwardly of a front edge 61a of the first metal panel 61. More specifically, the grounding connection elements 62 each have a downstanding portion 63 extending downward from a portion of the first metal panel 61 rearwardly adjacent to the front edge 61a into the upper resin frame 5 inwardly of the CF card 1, and a bent portion 64 extending forward from a distal edge 63a of the downstanding portion 63 along the lower surface 5a of the upper resin frame 5.

Figure 10:
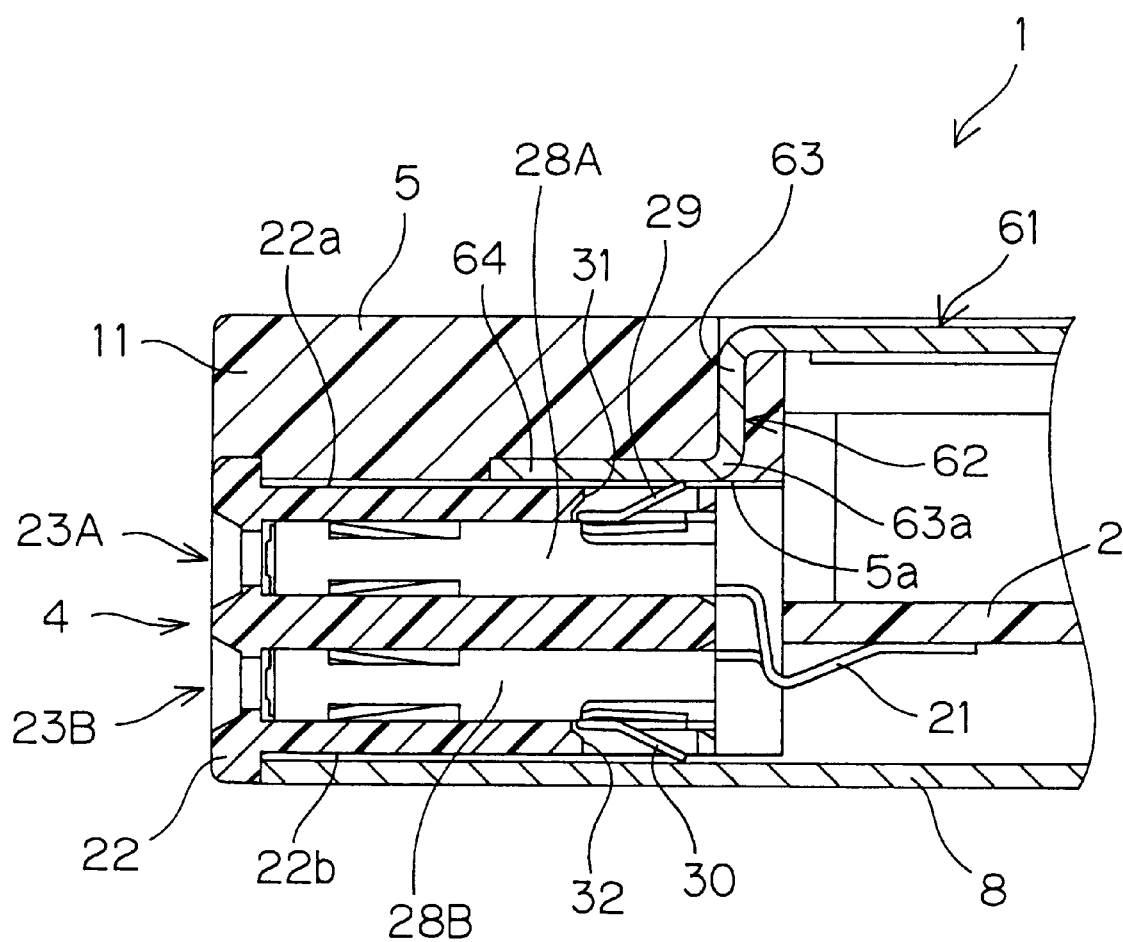
FIG. 10 is a sectional view illustrating major portions of the CF card according to the embodiment shown in FIG. 9.

As shown in FIG. 10, the grounding connection elements 62 are embedded in the front beam 11 of the upper resin frame 5 with the downstanding portions 63 thereof extending through the front beam 11. After the assembling of the CF card 1, the first grounding conductor elements 29 respectively project toward the bent portions 64 of the grounding connection elements 62 to be brought into resilient contact with the grounding connection elements 62 of the first metal panel 61, while the second grounding conductor elements 30 respectively project toward the second metal panel 8 to press against the second metal panel 8. In this manner, electrical connection between the first grounding conductor elements 29 and the grounding connection elements 62 of the first metal panel 61 and between the second grounding conductor elements 30 and the second metal panel 8 is achieved. Thus, the electrical connection between the metal panels 61, 8 and the ground contacts 28A, 28B is established, so that the first metal panel 61 and the second metal panel 8 are grounded when the CF card 1 is in use.

In the first embodiment, a metal plate having a greater size than the first metal panel 7 should be prepared for the provision of the grounding connection elements 41. In this embodiment, however, a metal plate to be used for the formation of the first metal panel 61 provided with the grounding connection elements 62 need not have a greater size than the metal panel 61.

While the two embodiments of the present invention have thus been described, the present invention can be embodied in any other ways. Although the grounding connection elements 41, 62 are formed integrally with the first metal panels 7, 61 in the aforesaid embodiments, grounding connection elements provided as separate members from the first metal panels 7, 61 may be embedded in the upper resin frame 5 (e.g., integrated by simultaneous molding) so as to be brought into contact with the metal panels 7, 61 and the grounding connection elements 41, 62 of the connector 4 for electrical connection therebetween.

In the aforesaid embodiments, the first and second grounding conductor elements 29, 30 are provided as separate members from the ground contacts 28A, 28B. However, the first and second grounding conductor elements 29 and 30 may be integrated with the ground contacts 28A and 28B, respectively.

In the aforesaid embodiments, the first and second grounding conductor elements 29 and 30 project from the housing 22 of the connector 4 toward the metal panels 7 and 8, respectively. However, the first and second grounding conductor elements 29, 30 are not required to project from the housing 22, for example, if portions of the metal panels 57, 58 are inwardly depressed and the depressed metal panel portions are inserted into the through-holes 31, 32 of the housing 22 in the case of the CF card 51 of Type I. In the case of the CF card 1 of Type II, on the contrary, the grounding connection elements 41 need to be formed with depressions which are to be brought into contact with the first grounding conductor elements 29.

While the present invention has been described in detail by way of the embodiments thereof, it should be understood that the foregoing disclosure is merely illustrative of the technical principles of the present invention but not limitative of the same. The spirit and scope of the present invention are to be limited only by the appended claims.

This application claims priority benefits under the Convention on the basis of Japanese Patent Application No. 11-192152 filed to the Japanese Patent Office on Jul. 6, 1999, the disclosure thereof being incorporated herein by reference.

What is claimed is:

1. An IC-incorporating card which is to be fitted in a card slot, the IC-incorporating card comprising:

a board mounted with an integrated circuit;

a resin frame defining an internal space for accommodating the board;

first and second metal panels attached to the resin frame to define the internal space;

a connector mounted on the board, and having a housing, a plurality of contacts retained in the housing for electrical connection to the card slot, and first and second grounding conductor elements connected to a ground contact of the plurality of contacts which is to be connected to a ground portion of the card slot, the first and second grounding conductor elements being exposed from the housing to be opposed to the first and second metal panels, respectively; and a grounding structure having a grounding connection element embedded in the resin frame, the grounding structure electrically connecting the first and second metal panels to the ground contact with the first grounding conductor element being electrically connected to the first metal panel via the grounding connection element and with the second grounding conductor element being in direct contact with the second metal panel for electrical connection therebetween.

2. An IC-incorporating card as set forth in claim 1, wherein the grounding connection element is integrated with the resin frame by simultaneous molding.

3. An IC-incorporating card as set forth in claim 1, wherein the grounding connection element is formed integrally with the first metal panel.

4. An IC-incorporating card as set forth in claim 1, wherein the first grounding conductor element and the second grounding conductor element have substantially the same construction.

5. An IC-incorporating card which is to be fitted in a card slot, the IC-incorporating card comprising:

a board mounted with an integrated circuit;

a resin frame defining an internal space for accommodating the board;

first and second metal panels attached to the resin frame to define the internal space;

a connector mounted on the board, and having a housing, a plurality of contacts retained in the housing for electrical connection to the card slot, and first and second grounding conductor elements connected to a ground contact of the plurality of contacts which is to be connected to a ground portion of the card slot, the first and second grounding conductor elements being exposed from the housing to be opposed to the first and second metal panels, respectively; and a grounding structure having a grounding connection element embedded in the resin frame, the grounding structure electrically connecting the first and second metal panels to the ground contact with the first grounding conductor element being electrically connected to the first metal panel via a grounding connection element and with the second grounding conductor element being in direct contact with the second metal panel for electrical connection therebetween, wherein the grounding connection element is formed integrally with the first metal panel and the grounding connection element is a portion of the first metal panel bent at an edge thereof adjacent to the connector as extending through the resin frame toward the connector.

* * * * *